Nov. 29, 1932.   S. M. CHASE   1,889,237
COUPLER
Original Filed Dec. 20, 1929   3 Sheets-Sheet 1
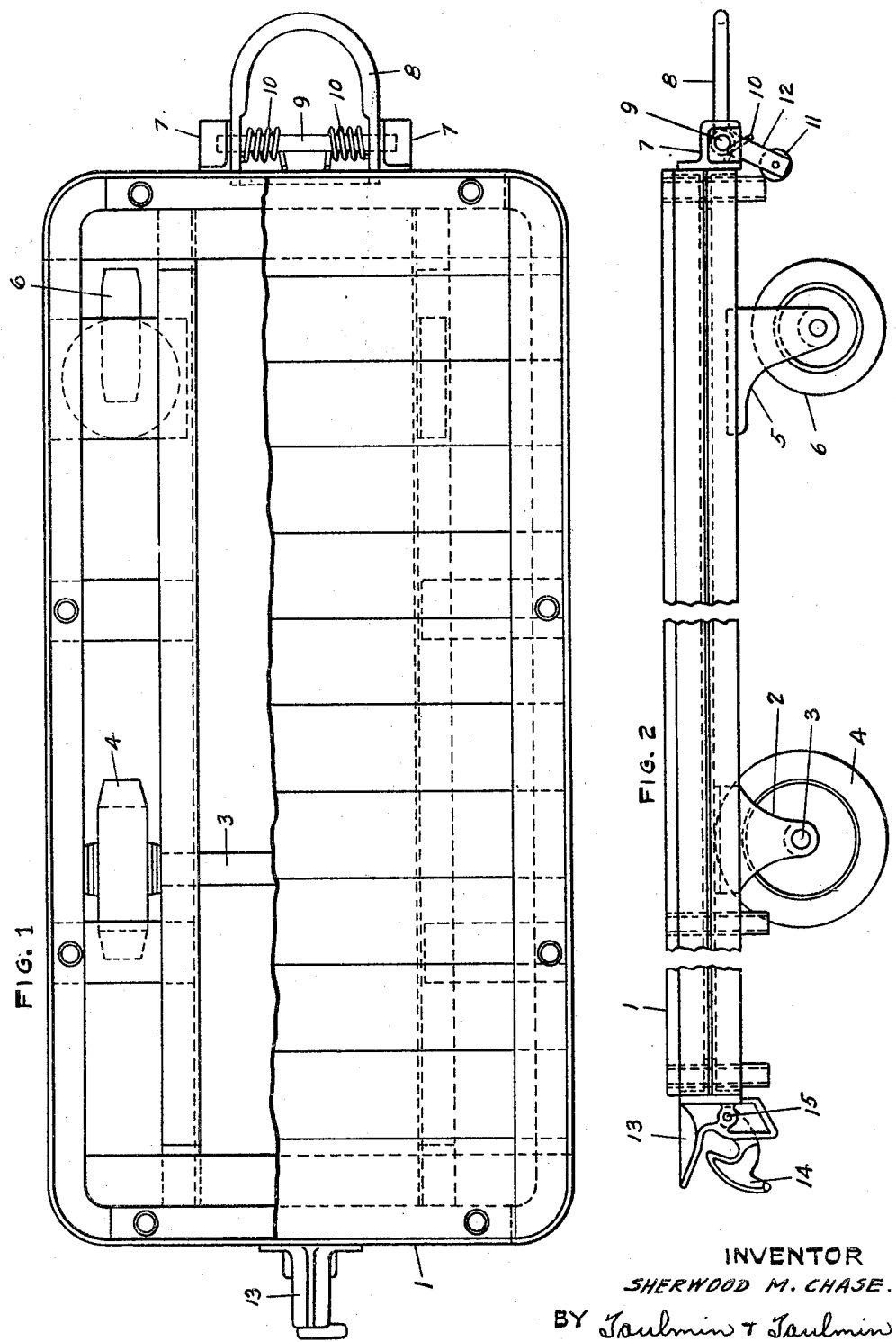
INVENTOR
SHERWOOD M. CHASE.
BY Toulmin & Toulmin
ATTORNEYS

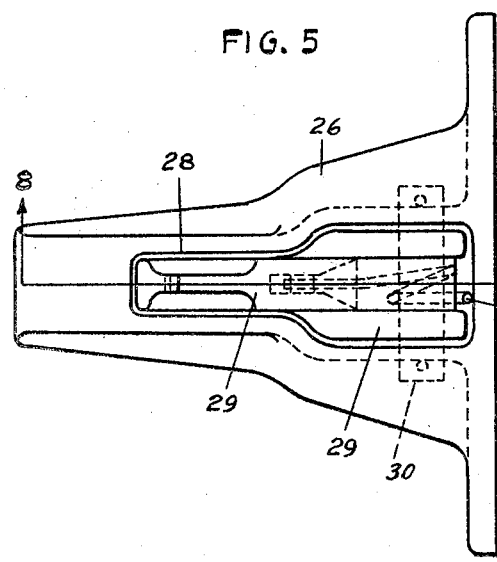
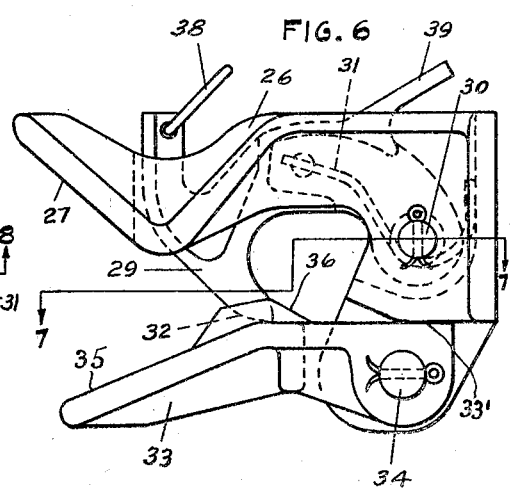
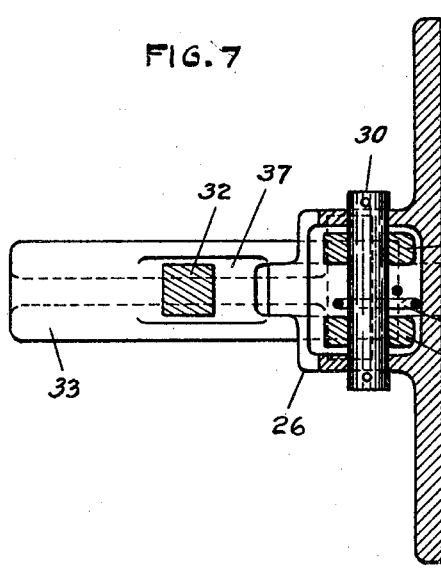
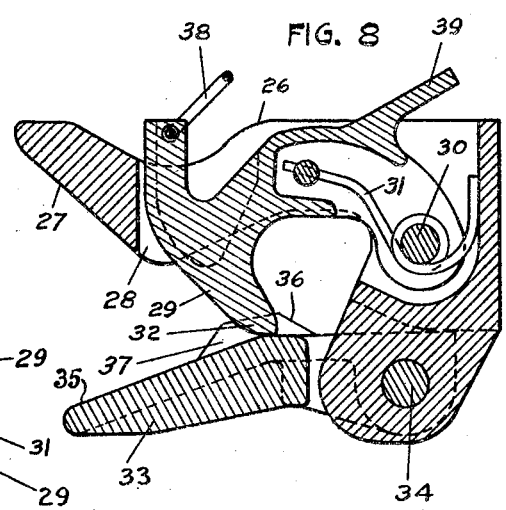

Patented Nov. 29, 1932

1,889,237

UNITED STATES PATENT OFFICE

SHERWOOD M. CHASE, OF COLUMBUS, OHIO, ASSIGNOR TO THE CHASE FDRY. AND MFG. COMPANY, OF COLUMBUS, OHIO, A CORPORATION OF OHIO

COUPLER

Original application filed December 20, 1929, Serial No. 415,388. Divided and this application filed December 31, 1930. Serial No. 505,830.

This invention relates to improvements in couplers, and has for its object the provision of an improved coupler in which there is a pivotally mounted bail member and means for supporting the bail member in substantially horizontal position.

It is also an object of this invention to provide means in connection with a bail to prevent the lateral movement of the bail, and for that purpose sleeves are provided on a shaft which supports the bail. These sleeves prevent the jaws associated with the bail from gripping or cramping the movements of the parts associated with them.

These and other advantages will appear from the following description taken in connection with the drawings.

This is a divisional application of a copending application Ser. No. 415,388, filed December 20, 1929.

Referring to the drawings:

Figure 1 is a top plan view of a truck to which the couplers are attached.

Figure 2 is a side elevation of the truck shown in Figure 1 with the couplers attached thereto.

Figure 5 is a top plan view of a coupler used in connection with the bail shown in Figure 3.

Figure 6 is a side elevation of the structure shown in Figure 5.

Figure 7 is a section on the line 7—7 of Figure 6.

Figure 8 is a section on the line 8—8 of Figure 5.

Figure 3:
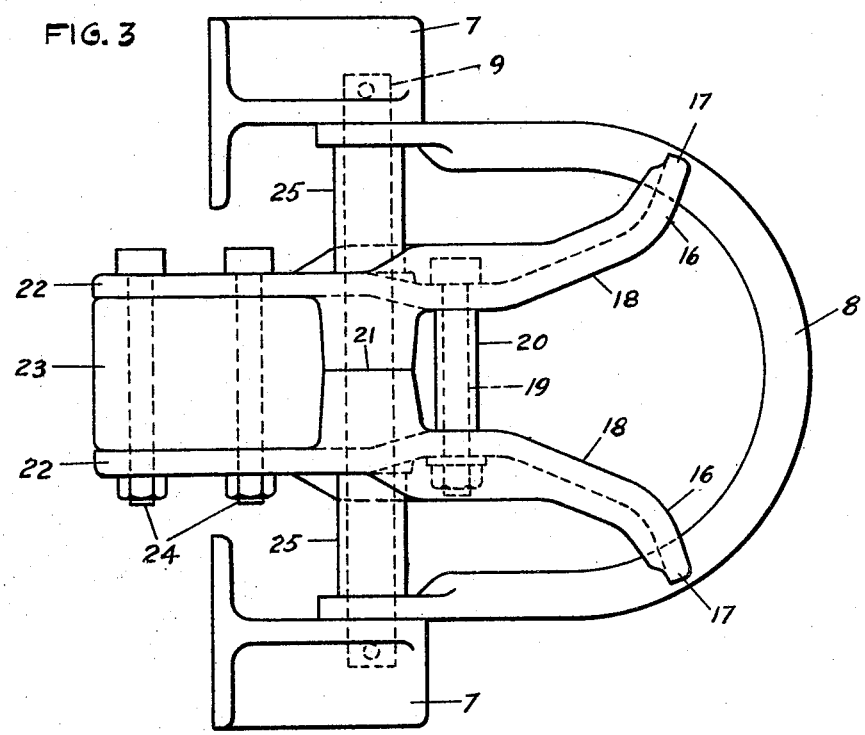
Figure 3 is a top plan view of a slightly modified form of bail supporting and bail operating structure.

The reference numeral 1 is used to designate as a whole the truck or frame to which applicant's improved coupler is attached. Extending downwardly from the frame are bracket members 2 which support a transverse axle 3, which has on each end a wheel 4. Adjacent the other end of the truck frame are swivel wheel brackets 5 which carry wheels 6. To one end of the frame is attached a bracket 7. This bracket supports a bail 8 by means of a shaft or pivot rod 9. The bail is U-shaped and has through its ends a hole to receive the shaft or rod 9.

For the purpose of retaining the bail in a horizontal position or bringing it back to horizontal position when it has been forced into other positions, there are provided springs 10. One end of each spring is attached to the bail and the other end is attached to the frame and intermediate the ends each spring is coiled around the shaft or pivot rod 9. There is also provided and cooperating with the springs in holding the bail in horizontal position a weight 11, which is supported by arms 12 extending downwardly from the bail. The springs and the weight cooperating with one another hold the bail in substantially horizontal position so that it may readily engage with the cooperating coupler member. Cooperating with the bail and forming therewith means for uniting two trucks together is a coupler 13 which extends from one end of the truck. Cooperating with this coupler 13 is a cooperating jaw 14, pivoted at 15 to the coupler member 13.

This pivoted jaw is in the form of an upwardly directed hook member and is adapted to receive the bail, such as that used and shown on the other end of the truck found in Figure 1. This hook member is provided with a weight adapted to hold it in bail-engaging position, such as that shown in Figure 2. When two trucks are to be united the bail will engage with the hook member and tend to force it down, but after the bail has slipped by the hook the weight thrusts the hook upward so that it engages the bail and holds the two trucks in cooperative engagement with each other so that tension on one will cause the other one to follow.

Figure 4:
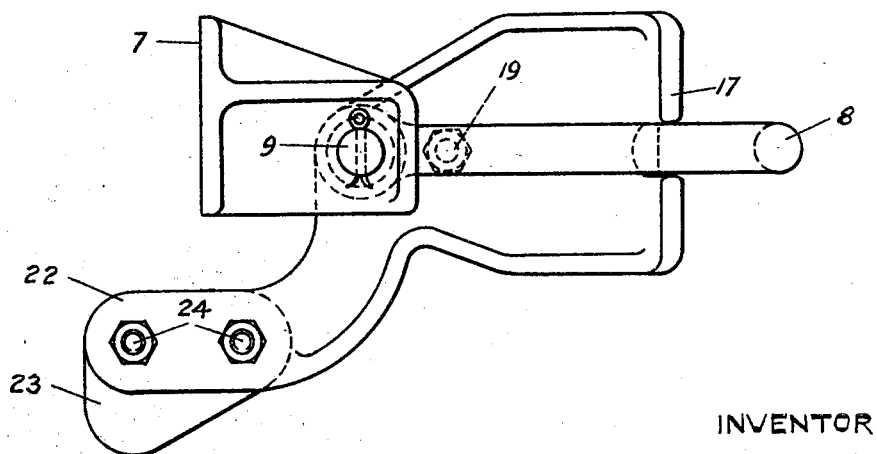
Figure 4 is a side elevation of the form shown in Figure 3.

In Figures 3 to 8 there are shown slightly modified forms of coupler members. In the forms shown in these figures there is a bail similar to that shown in Figures 1 and 2, but in this form there are shown cooperating with the bail, guide arms 16 which are provided with outer jaws 17 for engaging the bail. These guide arms extend above and below the bail and form broad guiding surfaces 18.

These guide arms are pivotally mounted upon the bail shaft 9 and are connected together by means of a bolt 19 which carries a spacer sleeve 20 between the guide arms 16. Each guide arm is separate from the other, being joined by the bolt 19 and engaging each other along the line of their respective faces at 21. The rear ends of the guide arms are designated 22 and carry between them a weight 23 on bolts 24 which extend through the rearwardly and downwardly extending portions of the arms 22.

The weight 23 serves to counteract any tendency to throw the bail out of horizontal position, and normally tends to hold the bail in a horizontal position. The weight of the bail and the weight of the weight are so proportioned that they tend to hold the bail in a horizontal position.

In the present instance, instead of using a spring between the guide arms and the ends of the bail, sleeves 25 are provided. These sleeves are arranged so that the parts cannot move laterally on the shaft, yet sufficient play is allowed so that these parts will operate freely without unnecessary binding. It has been found that by substituting the sleeves instead of springs the jaws are prevented from gripping or cramping the movements of the parts due to lateral strains or blows.

Cooperating with the bail and its associated structure shown in Figures 3 to 8, there is also a cooperating coupler structure. In this part of the coupler structure there is a fixed jaw 26, which has on the outer end thereof an upwardly inclined cam surface 27 which is adapted to receive and guide the bail in the process of coupling two trucks together. Extending vertically through the fixed jaw is a slot 28 in which there is a pivotally mounted hook member 29 on a shaft 30. This shaft is supported in the fixed jaw.

Around the shaft and engaging the hook member and some part of the fixed jaw is a spring 31 tending to hold the hook member in a downward bail-engaging position. The hook part of the hook member is indicated by the numeral 32 and is adapted to be pressed upwardly when the bail is forced into locking position, and after the bail has been properly seated behind the hook, the hook member drops so as to engage the bail due to the action of the spring 31.

Cooperating with the fixed jaw and the pivoted hook member is a pivoted jaw 33 which is pivoted at 34 to the lower end of a downward extension of the fixed jaw 26, and is normally held in a horizontal position by engaging the fixed jaw extensions at 33'. This pivoted jaw merely permits the upward swinging movement of all of the pivoted parts without interfering with their holding the bail. This pivoted jaw has an inwardly inclined surface 35 which cooperates with the surface 27 in receiving and properly seating the bail member during the time the two trucks are being coupled.

In order to hold the pivoted hook member in a substantially horizontal position, there is provided on the pivoted jaw a shoulder 36 which cooperates with one part of the hook member for holding it in horizontal position but permits the jaw to be swung up at its outer end. In order to prevent the bail becoming detached from the hook, and to prevent the lateral movement of the hook when under strain, there is provided on the upper surface of the pivoted jaw a groove 37 in the shoulder 36 in which the tip end of the hook rests when it is in normal bail-engaging position. In order that the hook may be elevated so that the bail may be released, there is provided a link 38 adapted to be gripped by the hand of the operator or by any other suitable means so that the hook may be elevated for releasing the bail on the adjacent end of another truck. There is also provided a foot treadle 39 for elevating the hook so that a bail may be disengaged. By this means the person standing on one end of the truck may, by placing his foot upon the treadle, disengage two adjacent trucks.

I desire to comprehend within my invention such modifications as may be embraced within my claims and the scope of my invention.

Having thus fully described my invention, what I claim as new and desire to secure by Letters Patent is:

1. In a trailer truck, a coupler therefor consisting of a bail pivotally mounted thereon for vertical swinging movement, and a weight means supported independent of the bail tending to bring said bail to a horizontal position after being swung either up or down.

2. In combination, a shaft, a U-shaped bail on said shaft, guides pivoted on said shaft and engaging said bail, and a spacing sleeve between each end of the bail and the guides.

3. In combination, a shaft, a U-shaped bail on said shaft, guides pivoted on said shaft and engaging said bail, and spacing sleeves on said shaft to hold the guides spaced from the bail.

4. In combination, a shaft, a U-shaped bail on said shaft, guides pivoted to said shaft and engaging said bail, means on the guides tending to maintain the bail in a certain position, and sleeves on the shaft to hold the guides spaced from the bail.

5. In combination, a shaft, a U-shaped bail on said shaft, converging guide members on said shaft and engaging said bail, a sleeve at each end of the shaft between the guide members and the bail, and means on the guide members tending to maintain the bail in a certain position.

In testimony whereof, I affix my signature.

SHERWOOD M. CHASE.